: 3,125,543
STABILIZED CHLOROETHYLENIC POLYMER LATEXES
Edwin A. Blake and James J. Dahl, Midland, Mich., assignors to The Dow Chemical Company, Midland, Mich., a corporation of Delaware
No Drawing. Filed Apr. 21, 1960, Ser. No. 23,613
15 Claims. (Cl. 260—23)

This invention concerns improvements in polymer latex compositions and, more particularly, concerns the mechanical stability of chloroethylenic polymer containing latexes and the thermal stability of films prepared therefrom.

It is well known that chlorine containing polymer compositions such as the chloroethylenic copolymer latexes are quite mechanically unstable and that the films formed from such latexes are thermally unstable. In Canadian Patent No. 566,150, issued November 18, 1958, to Greenspan and Gall, it is suggested that polyvalent salts of certain epoxy fatty acids can lend heat and light stability to polyvinyl chloride compositions. However, no suggestion lies in the art concerning the concurrent solving of the problem of film thermal stability and the mechanical stability of the latexes.

It is therefore an object of this invention to improve the mechanical stability of chloroethylenic polymer latexes.

It is a further object to improve the thermal stability of films made from such chloroethylenic polymer latexes.

It is a still further object that the improved mechanical stability of such latexes and the improved thermal stability of such films be secured simultaneously in a new composition containing chloroethylenic polymers.

We have now found that the foregoing and related objects can be obtained in a stabilized composition of a chloroethylenic polymer latex containing about one percent of an alkali metal salt of an epoxy fatty acid wherein said acid contains from about 16 to about 22 carbon atoms.

The unstable polymeric material adapted to be used in the compositions of the invention comprises any chloroethylenic polymer. This includes, in particular, homopolymers of vinyl chloride and vinylidene chloride as well as copolymers and other interpolymers of vinyl chloride and/or vinylidene chloride with other ethylenic unsaturated comonomers such as vinyl acetate; acrylonitrile; vinyl proprionate; the alkyl, cycloalkyl, and aryl acrylates; and the like. The polymeric material also includes blends of a chloroethylenic polymer or copolymer with a non-chlorine containing polymer or copolymer. Degradation of relatively small proportions of chloroethylenic polymers can affect significantly relatively large proportions of other polymers associated therewith.

The stabilizing materials, the alkali metal salts of epoxy fatty acids, of particular concern in the invention are the sodium and potassium salts of the epoxy derivatives of oleic, palmitic, margaric, stearic, nondecylic, arachidic, and behinic acids. Sodium epoxystearate is especially suitable. The stabilizer is added to the composition in an optimum proportion of about one percent by weight. This proportion, however, is not critical and the advantages of the invention can be secured with some degree of latitude in the proportion of stabilizer used.

Example

A 52.5 percent solids latex having a polymer composition of 25 percent vinylidene chloride and 75 percent vinyl chloride was formulated in the conventional manner. One portion of the latex was set aside as a control. One percent sodium epoxystearate was added to a second portion of the latex. The latex altered by the addition of the sodium epoxystearate had definitely superior mechanical stability compared to the control latex. Further, films were formed from the two latex samples and, following heating to 150° C. for various periods of time, were tested for light transmission in a Beckman spectrophotometer (Model D 4). The percent transmission at 420 m$\mu$ per mil of film thickness is as follows:

| Sample | Percent Transmission | | |
| --- | --- | --- | --- |
| | 0 hours | 1 hour | 3 hours |
| Control | 83.1 | 80.4 | 69.0 |
| Control plus sodium epoxystearate | 85.1 | 81.4 | 74.9 |

The foregoing example was repeated using latexes formed from polymers of vinyl chloride and vinylidene chloride as well as copolymers of these materials with vinyl propionate, vinyl acetate, acrylonitrile, alkyl acrylates, cycloalkyl acrylates, and aryl acrylates. The example was also repeated using the sodium and potassium salts listed above. Results comparable with those reported in the foregoing example were obtained.

We claim:
1. A stabilized composition of a chloroethylenic polymer latex containing about one percent of an alkali metal salt of an epoxy fatty acid, wherein said acid contains from about 16 to about 22 carbon atoms.
2. The composition according to claim 1 wherein the polymer is a copolymer of vinyl chloride and vinylidine chloride.
3. The composition according to claim 1 wherein the polymer is a copolymer of vinyl chloride and vinyl propionate.
4. The composition according to claim 1 wherein the polymer is a copolymer of vinyl chloride and vinyl acetate.
5. The composition according to claim 1 wherein the polymer is a copolymer of vinyl chloride and an alkyl acrylate.
6. The composition according to claim 1 wherein the polymer is a copolymer of vinyl chloride and an aryl acrylate.
7. The composition according to claim 1 wherein the alkali metal salt is sodium epoxystearate.
8. A thermally stabilized film of a chloroethylenic polymer containing about one percent of an alkali metal salt of an epoxy fatty acid, wherein said acid contains from about 16 to about 22 carbon atoms.
9. The composition according to claim 8 wherein the polymer is a copolymer of vinyl chloride and vinylidene chloride.
10. The composition according to claim 8 wherein the polymer is a copolymer of vinyl chloride and vinyl propionate.

11. The composition according to claim 8 wherein the polymer is a copolymer of vinyl chloride and vinyl acetate.

12. The composition according to claim 8 wherein the polymer is a copolymer of vinyl chloride and an alkyl acrylate.

13. The composition according to claim 8 wherein the polymer is a copolymer of vinyl chloride and an aryl acrylate.

14. The composition according to claim 8 wherein the alkali metal salt is sodium epoxystearate.

15. A stabilized chloroethylenic polymer composition containing about one percent of an alkali metal salt of an epoxy fatty acid, wherein said acid contains from about 16 to about 22 carbon atoms.

References Cited in the file of this patent
UNITED STATES PATENTS

| | | |
|---|---|---|
| 2,684,353 | Greenspan et al. | July 20, 1954 |
| 2,902,465 | Bavely | Sept. 1, 1959 |
| 2,934,507 | Chadwick et al. | Apr. 26, 1960 |